United States Patent [19]

Uchida et al.

[11] 4,410,976

[45] Oct. 18, 1983

[54] SIGNAL PICKUP DEVICE IN A ROTARY RECORDING MEDIUM REPRODUCING APPARATUS

[75] Inventors: Masayoshi Uchida, Yokohama; Osamu Tajima, Ayase, both of Japan

[73] Assignee: Victor Company of Japan, Ltd., Yokohama, Japan

[21] Appl. No.: 291,047

[22] Filed: Aug. 7, 1981

[30] Foreign Application Priority Data

Aug. 11, 1980 [JP] Japan .......................... 55-113518[U]
Aug. 11, 1980 [JP] Japan .......................... 55-113519[U]

[51] Int. Cl.³ .............................................. G11B 9/06
[52] U.S. Cl. .................................. 369/170; 369/126; 369/151
[58] Field of Search ................. 369/170, 173, 126, 43, 369/44, 151

[56] References Cited

U.S. PATENT DOCUMENTS 4,030,124 6/1977 Allen ................................... 369/126
4,160,268 7/1979 Goto et al. .......................... 369/170
4,310,913 1/1982 Miller .................................. 369/126

Primary Examiner—Steven L. Stephan
Attorney, Agent, or Firm—Louis Bernat

[57] ABSTRACT

A signal pickup device in a rotary recording medium reproducing apparatus, comprises a cantilever provided with a reproducing element for picking up and reproducing a signal from a rotary recording medium at the tip end thereof, a support member having a support part for supporting the rear end part of the cantilever, and arms which unitarily extend on both sides from the support part, and a frame having engaging parts engaged with and mounted with the arms of the support member, for holding the arms. The arms of the support member respectively are provided with mounting parts having non-circular cross-section in the vicinity of the end part thereof, for engaging with the engaging parts of the frame. Moreover, the mounting parts and the engaging parts are shaped so that the support member is at an angular position together with the cantilever where the reproducing element is at a raised position, when the mounting parts are mounted onto the engaging parts.

7 Claims, 6 Drawing Figures

SIGNAL PICKUP DEVICE IN A ROTARY RECORDING MEDIUM REPRODUCING APPARATUS

BACKGROUND OF THE INVENTION

The present invention generally relates to signal pickup devices in rotary recording medium reproducing apparatuses, and more particularly to a signal pickup device in which a cantilever having a reproducing element at the tip end thereof is supported by a resilient support member, so that the cantilever is at a position where the cantilever does not project from the signal pickup device when the signal pickup device is not in use.

Apparatuses have been reduced to practical use, which is capable of reproducing a recorded information signal from a rotary recording medium (hereinafter simply referred to as a disc) in which an information signal such as a video signal and an audio signal is recorded as variations in geometrical configuration, according to variations in electrostatic capacitance between the above disc and an electrode of a reproducing stylus. In a signal pickup device used in a reproducing apparatus of the above type, the reproducing stylus is receded inside the signal pickup device when the signal pickup device is not in use, in order to protect the reproducing stylus. When the signal pickup device is in use, the signal pickup device is constructed to lower the reproducing stylus, so that the reproducing stylus makes contact with and can slide against the surface of the disc.

Accordingly, the present inventor has previously attempted to realize a signal pickup device in which a part in the vicinity of the rear end of a cantilever having a reproducing stylus at the tip end thereof, is supported by a resilient support member. Hence, in this signal pickup device, the reproducing stylus is receded inside the signal pickup device when the signal pickup device is not in use, and the reproducing stylus is forcibly lowered when the signal pickup device is in use. However, in this signal pickup device, the mounting angle is difficult to determine when the above resilient support member is mounted to a frame of a pickup cartridge which forms an essential part of the signal pickup device. Therefore, inconsistency is introduced in mounting the above resilient support member to the frame of the pickup cartridge. When inconsistency is introduced upon mounting of the resilient member onto the main body of the signal pickup device, there are cases where the reproducing stylus is not completely receded inside the signal pickup device when the signal pickup device is not in use. Further, the height position of the reproducing stylus with respect to the disc becomes inconsistent. Hence, there was a disadvantage in that the stylus pressure of the reproducing stylus with respect to the disc became inconsistent, even when the reproducing stylus is lowered by a constant force.

Moreover, in an apparatus which reproduces a disc in which the above information signal is recorded in a main track without forming a guide groove for the reproducing stylus, and reference signals for tracking control are recorded on both sides of the main track, the cantilever is displaced by obtaining a tracking control signal from the reproduced reference signals. In this reproducing apparatus, tracking control is performed so that the reproducing stylus accurately traces over the main track. In addition, the cantilever is displaced in the longitudinal direction thereof according to a jitter compensation signal, in order to perform jitter compensation.

The resilient support member which supports the above cantilever is repetitively deformed in response to the movement of the cantilever, when the cantilever swings or moves in the longitudinal direction thereof within a minute range, due to the tracking control operation, jitter compensation operation, wobble in the surface of the disc, and the like. The frequency characteristic of the signal pickup device is determined by the distance of the range in which the resilient support member undergoes resilient deformation.

Conventionally, the resilient support member is mounted onto the frame of the pickup cartridge by inserting the tip end sides of arms of the resilient support member into the cutout of the frame, to fix the inserted part by a binding agent. Accordingly, depending on whether the binding agent is adhered to the outer side or the inner side of the frame of the pickup cartridge, the length of a part of the resilient support member which undergoes resilient deformation differs. Therefore, there was a disadvantage in that the frequency characteristic of the assembled signal pickup device was inconsistent due to the above described reasons.

SUMMARY OF THE INVENTION

Accordingly, it is a general object of the present invention to provide a novel and useful signal pickup device in a rotary recording medium reproducing apparatus, in which the above described disadvantages have been overcome.

Another and more specific object of the present invention is to provide a signal pickup device constructed so that a reproducing element is at an angular position where the reproducing element is raised together with a cantilever, when an arm portion of a support member for supporting the cantilever having the reproducing element at the tip end thereof, is mounted onto a frame. According to the device of the present invention, there is no need to adjust the angular position after the support member is mounted onto the frame.

Still another object of the present invention is to provide a signal pickup device in which a constricted part is formed in the arm portion of the support member, for positively restricting a resilient deformation range of the support member to a predetermined range. According to the device of the present invention, no inconsistency is introduced in the frequency characteristic of a mechanism including the support member, without being influenced by errors introduced upon assembling of the device.

Other objects and further features of the present invention will be apparent from the following detailed description when read in conjunction with the accompanying drawings.

DETAILED DESCRIPTION

Figure 1:
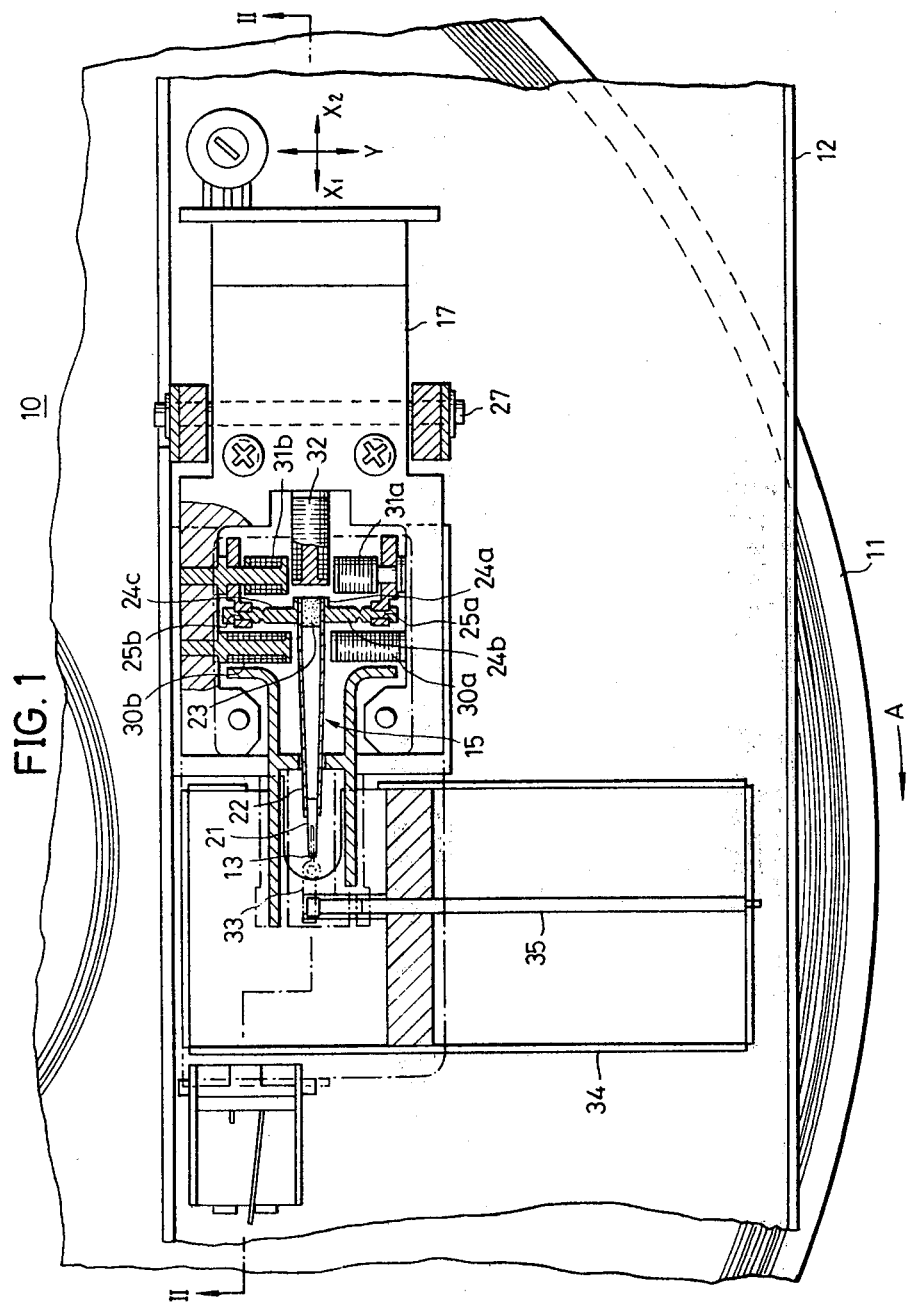
FIG. 1 is a plan view, partly in horizontal cross-section, showing an embodiment of a signal pickup device according to the present invention.
Figure 2:
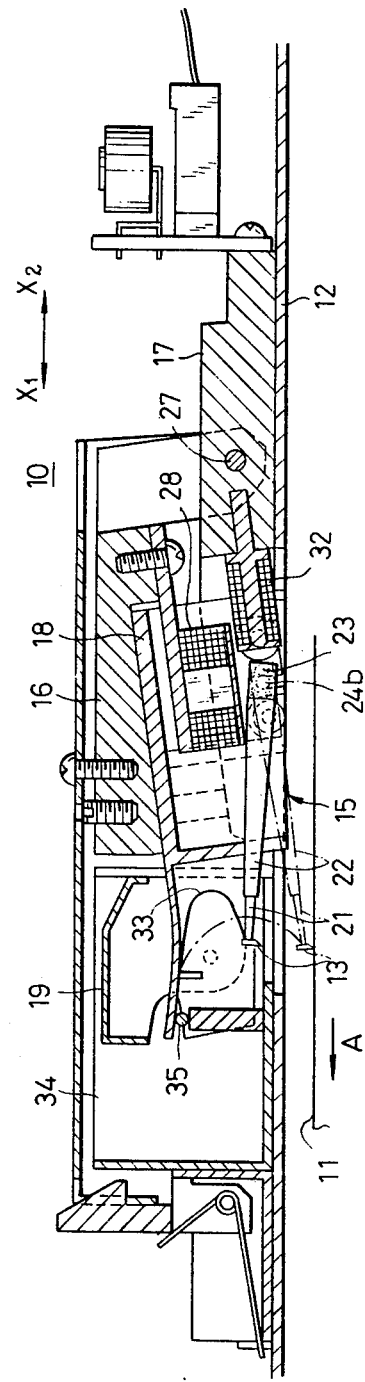
FIG. 2 is a vertical cross-section, showing the device along lines II—II in FIG. 1.
Figure 3:
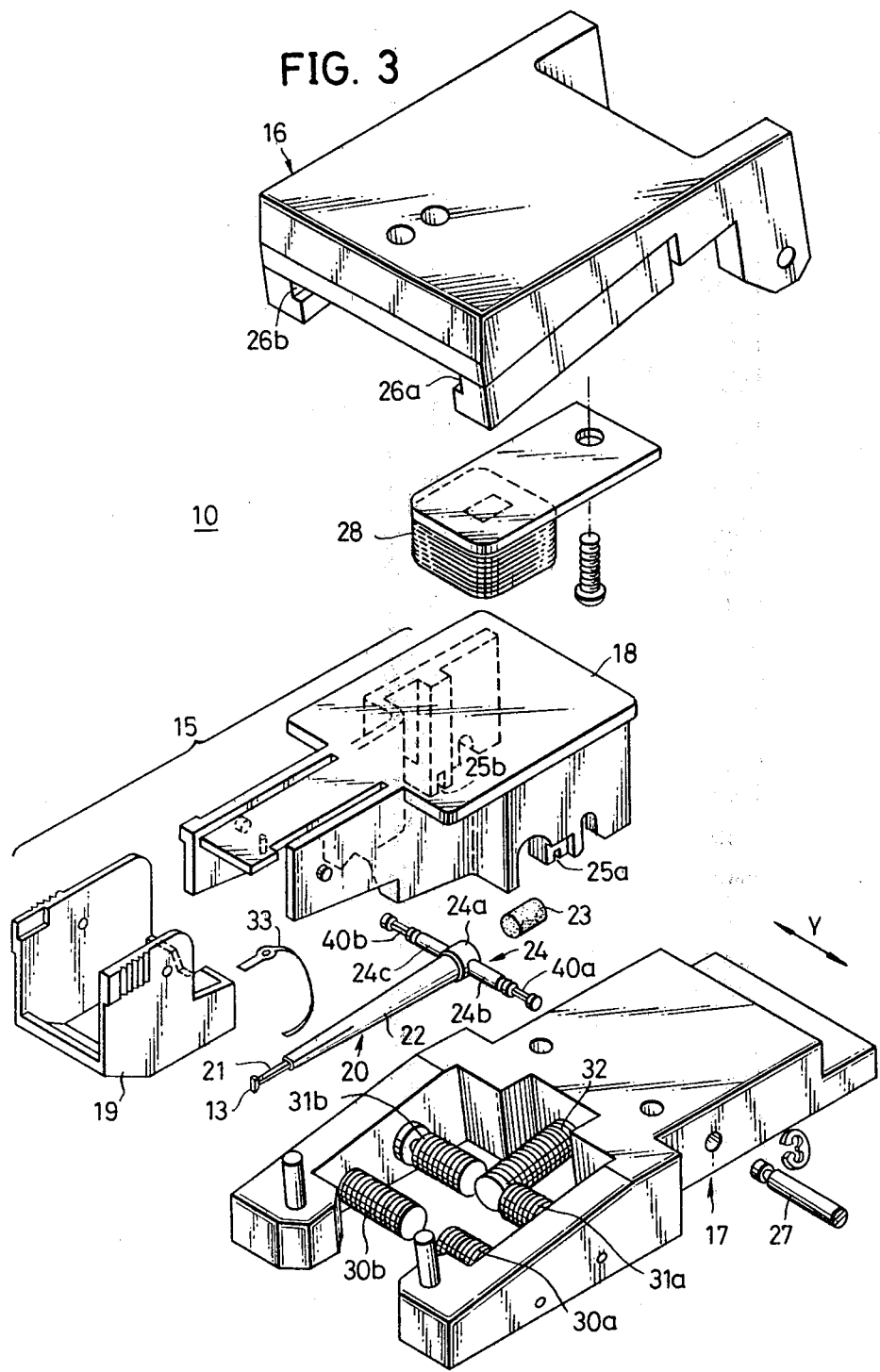
FIG. 3 is an exploded perspective view showing the signal pickup device shown in FIGS. 1 and 2.

In FIGS. 1 through 3, a signal pickup device 10 is provided within a carriage 12 which moves in a radial direction of a disc 11. A reproducing stylus 13 relatively traces the spiral track of the disc 11 rotating in the direction indicated by an arrow A, and reproduces an information signal therefrom.

The signal pickup device 10 substantially comprises a pickup cartridge 15, a guide member 16 for receiving and rotating the cartridge 15, and a fixed coil mounting member 17 mounted with a coil group. The cartridge 15 comprises a cartridge case 18, a lid 19, and a cantilever assembly 20 mounted with the reproducing stylus 13.

In the cantilever assembly 20, the reproducing stylus 13 is mounted at the tip end of a plate-shaped holder 21. The rear end of the holder 21 is mounted to the tip end of a cantilever 22 constructed from a pipe made of light metal such as aluminum. A permanent magnet 23 having a cylindrical shape and magnetized in a longitudinal or axial direction thereof, is fixedly inserted into a space part at the rear end of the cantilever 22. A ring-shaped part 24a of a resilient support member (suspension) 24 made of rubber, is inserted and connected to the rear end outer periphery of the cantilever 22. A pair of arms 24b and 24c unitarily extend in a direction perpendicular to the longitudinal direction of the cantilever 22, which are provided at both sides of the ring-shaped part 24a of the support member 24.

The cantilever assembly 20 of the above described construction, is accommodated within the case 18 wherein mounting parts 40a and 40b provided on the arms 24a and 24b of the support member 24, are pushed and inserted into slots 25a and 25b of the case 18, as will be described hereinafter. The lid 19 is mounted freely rotatable on the case 18, and when the cartridge 15 is not used, the lid 19 is in a rotated position where the reproducing stylus 13 is protected. On the other hand, when the cartridge 15 is being used, the lid 19 is rotated to a position where the reproducing operation of the reproducing stylus 13 is not interfered.

The guide member 16 comprises grooves 26a and 26b for receiving both side edge parts of the case 18 of the cartridge 15, and is rotatably mounted on the carriage 12 by a shaft 27. A coil 28 is fixed onto the lower surface of the guide member 16.

The coil mounting member 17 is fixed to a housing (not shown), and comprises tracking control coils 30a, 30b, 31a, and 31b, and jitter compensation coil 32 mounted thereon. The arms 24b and 24c of the support member 24 in the above cantilever assembly 20, are respectively inserted in spaces formed between the coils 30b and 31b, and the coils 30a and 31a, when the guide member 16 inserted with the cartridge 15 is rotated in the downward direction. The axes of the coils 30a, 30b, 31a and 31b are arranged in a direction perpendicular to the magnetized direction of the permanent magnet 23. On the other hand, the axis of the coil 32 is arranged in the same direction as the magnetized direction of the permanent magnet 23.

When the cartridge 15 rotates in the downward direction together with the above guide member 16, a metal ribbon 33 which is drawn out from the reproducing stylus 13 presses against a central conductor 35 of a resonator 34.

In a state in which a current is not applied to the coil 28, the cantilever 22 is supported by the support member 24 as shown by a solid line in FIG. 2, and the reproducing stylus 13 is positioned at a height position where the reproducing stylus 13 does not make contact with the disc 11. Upon reproduction, when a current is applied to the coil 28, the cantilever 22 receives a downward force, and rotates downward while twisting the support member 24 as shown by one-dot chain line in FIG. 2. Accordingly, the reproducing stylus 13 is applied with a predetermined stylus pressure, and makes contact with the disc 11.

By flowing a current having a level and direction respective of a tracking error signal through the tracking control coils 30a, 30b, 31a, and 31b, opposite magnetic polarities are introduced at the edge surfaces of the opposing coils. Hence, a repulsive force is introduced on one hand, and on the other, an attractive force is introduced between the magnetic polarities of the permanent magnet 23. Accordingly, the cantilever 22 is displaced by a predetermined quantity in a direction the tracking error is to be compensated, in the radial direction of the disc 11 shown by arrow Y. Furthermore, when a jitter compensation current having a level and polarity respective of the jitter which is to be compensated, is passed through the jitter compensation coil 32, a magnetic field is introduced between the permanent magnet 23 and the coil 32. When a magnetic polarity which is the same as that of the permanent magnet 23 is introduced at the edge surface of the coil 32 opposing the permanent magnet 23, a repulsive force is introduced between the coil 32 and the permanent magnet 23 and displaces the cantilever 22 in the direction shown by an arrow X1, to compensate for the jitter. On the other hand, when a magnetic polarity which is opposite to that of the permanent magnet 23 is introduced at the edge surface of the coil 32 opposing the permanent magnet 23, an attractive force is introduced between the coil 32 and the permanent magnet 23 and displaces the cantilever 22 in the direction shown by an arrow X2, to compensate for the jitter.

Figure 4:
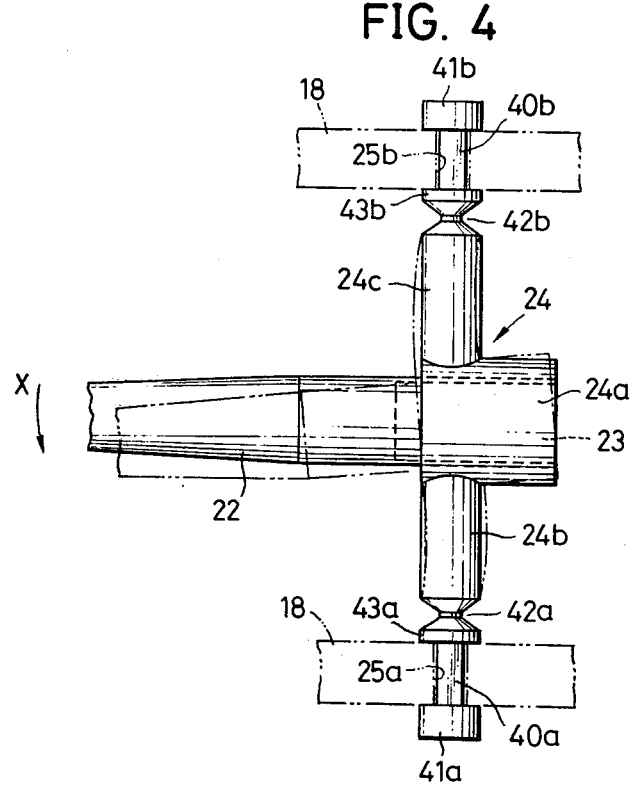
FIG. 4 is a plan view showing a resilient support member which forms an essential part of the signal pickup device shown in FIGS. 1, 2, and 3.

Next, description will be given with respect to the resilient support member 24 which forms an essential part of the signal pickup device according to the present invention, in conjunction with FIGS. 4, 5A, and 5B. The mounting parts 40a and 40b having a square cross-section, are respectively formed on the arms 24b and 24c of the support member 24, excluding flange portions 41a and 41b provided at the end part thereof. Further, constricted parts 42a and 42b having small diameters, are provided on the arms 24b and 24c between the mounting parts 40a and 40b, excluding flange portions 43a and 43b. The minimum diameters of the constricted parts 42a and 42b are smaller than the minimum sizes of the mounting parts 40a and 40b.

Figure 5A:
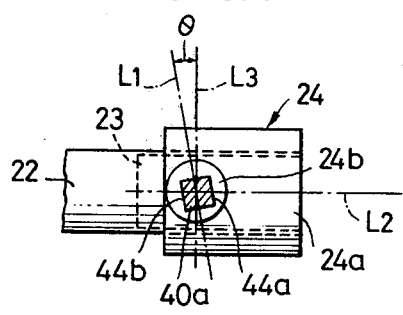
FIGS. 5A and 5B respectively are, a side view, partly in vertical cross-section, showing a resilient support member, and a side view, partly in vertical cross-section, showing the resilient support member in a state where the resilient support member is mounted onto a cartridge case, together with a part of a cantilever.

As shown in FIG. 5A, the shape of the mounting part 40a (40b) is determined so that a center line L1 parallel with both side surfaces 44a and 44b of the mounting part 40a (40b) is at an angular position rotated by an angle θ towards the counterclockwise direction with respect to a line L3 which is perpendicular to an axial line L2 extending in the longitudinal direction of the cantilever 22.

Figure 5B:
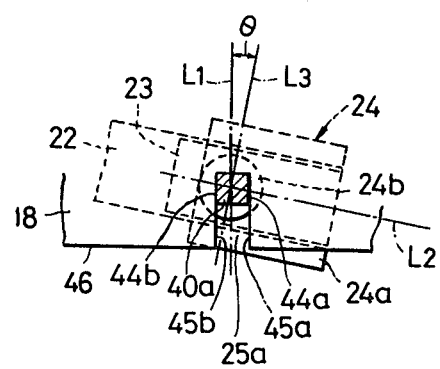

On the other hand, as shown in FIG. 5B, both side edges 45a and 45b of the square slot 25a (25b) formed at both side lower edges of the cartridge case 18, are formed perpendicular to a lower end edge 46 of the case 18.

The rear end part of the cantilever 22 is inserted into the ring-shaped part 24a, as shown in FIG. 5B. Both the side surfaces 44a and 44b of the mounting parts 40a and 40b respectively provided on the arms 24b and 24c of the support member 24 which supports the cantilever 22, are respectively inserted and pressed against both the side edges 45a and 45b of the slots 25a and 25b respectively provided in the cartridge case 18, and adhered by a binding agent. Since the mounting parts 40a and 40b are of the above described shape, in a state where the mounting parts 40a and 40b are inserted into the slots 25a and 25b and mounted as shown in FIG. 5, the axial line L2 of the cantilever 22 is inclined with respect to the lower end edge 46 of the case 18, in a state where the tip end of the cantilever 22 is lifted upwards.

Accordingly, in a state where the pickup cartridge 15 is loaded into the signal pickup device 10, the cantilever 22 is naturally in a raised state indicated by the solid line in FIG. 2, without providing any means for urging the cantilever 22 upwards. Thus, in this state, the reproducing stylus 13 is at a receded position within the signal pickup device 10.

Both the side surfaces 44a and 44b of the mounting parts 40a and 40b respectively provided on the support member 24, make contact with both the side edges 45a and 45b of the slots 25a and 25b, and the direction towards which the side surfaces 44a and 44b face, are restricted by the above side edges 45a and 45b. Hence, the cantilever 22 assumes the position shown in FIG. 5B, with a predetermined inclination, just by inserting the mounting parts 40a and 40b of the support member 24 shown in FIG. 5A into the slots 25a and 25b of the case 18. In this case, no adjusting operations need be performed, which requires the use of special adjusting instruments to adjust the inclination of the cantilever 22.

Therefore, in a state where the pickup cartridge 15 thus assembled in the above described manner is mounted to the signal pickup device shown in FIG. 2, the cantilever 22 is at an accurate predetermined raised position as indicated by the solid line in FIG. 2. Hence, the reproducing stylus 13 is also at an accurate predetermined height position with respect to the disc 11. Accordingly, in a state where a current is applied to the coil 28 upon reproduction, and the cantilever 22 is lowered as indicated by the one-dot chain line in FIG. 2, the reproducing stylus 13 accurately makes contact with the disc 11 with a predetermined stylus pressure.

As a modification of the above described embodiment of the invention, the mounting parts 40a and 40b can be formed so that the center line L1 of the mounting parts 40a and 40b which is parallel with the side surfaces 44a and 44b, coincides with the line L3 which is perpendicular to the axial line L2 of the cantilever 22. In this modified case, the slots 25a and 25b can be formed in an inclined manner so that the cantilever 22 is inclined upwards when the mounting parts 40a and 40b are inserted into the slots 25a and 25b.

In addition, the cross-sectional shape of the mounting parts 40a and 40b is not limited to the square shape described above. All that is required is for the mounting parts 40a and 40b to have a cross-sectional shape other than a circular shape, so that the mounting angle is naturally determined when the mounting parts 40a and 40b are inserted into the slots 25a and 25b. Further, the shape of the slots 25a and 25b can be of any shape respective of the shape of the mounting parts 40a and 40b, and non-circular holes may be provided instead of the above square-shaped slots 25a and 25b.

Upon reproduction, the tracking control signal is supplied to the tracking control coils 30a through 31b, in order to perform the tracking control. Accordingly, when the cantilever 22 is displaced towards the direction of the arrow X in FIG. 4 as indicated by the two-dot chain line, the support member 24 is resiliently deformed as indicated by the two-dot chain line, due to the above displacement in the cantilever 22.

A bending force acts on the base side of the arms 24b and 24c due to the rotation of the ring-shaped part 24a, and this bending force is transmitted towards the tip end side of the arms 24b and 24c. Moreover, the constricted parts 42a and 42b are easily bent, and the bending force is substantially prevented from being transmitted beyond these constricted parts 42a and 42b to the tip end side of the arms 24b and 24c. Accordingly, the arms 24b and 24c always respectively bend at parts between the constricted parts 42a and 42b, regardless of the inconsistency introduced in the adhering positions where the binding agent is adhered between the mounting parts 40a and 40b and the slots 25a and 25b. Therefore, the frequency characteristic of the supporting part of the cantilever 22 which is respective of the tracking control operation, becomes constant without being influenced by the inconsistency introduced upon assembling of the device.

When a jitter compensation current is supplied to the jitter compensation coil 32 to perform jitter compensation, and the cantilever 22 moves back and forth along the axial direction thereof, the arms 24b and 24c of the support member 24 respectively bend at the parts between the constricted parts 42a and 42b, as in the above described case. Further, when the cantilever swings in response to wobble in the surface of the disc 11, the support member 24 mainly bends at the constricted parts 42a and 42b. Hence, the support member 24 also undergoes resilient deformation in these cases, regardless of the fixed position of the support member 24 with respect to the case 18.

Therefore, the frequency resonance characteristic of the support mechanism for the cantilever 22 which directly effects the performance of the signal pickup device, can be unified without being influenced by the inconsistency introduced upon assembling of the device. Accordingly, signal pickup devices can be manufactured, which have unified performance and quality.

In the above embodiment of the invention, the constricted parts 42a and 42b are shown as having a V-shape in the plan view. However, the shape of these constricted parts 42a and 42b is not limited to that in the above embodiment of the invention, and can be of an U-shape, to obtain similar effects.

Further, this invention is not limited to these embodiments, but various variations and modifications may be made without departing from the scope of the invention.

What is claimed is:

1. A signal pickup device in a rotary recording medium reproducing apparatus, said signal pickup device comprising:

a cantilever having a reproducing element for picking up and reproducing a signal from a rotary recording medium, said pickup element being located at the tip end of said cantilever;

a support member having a support part for supporting the rear end of said cantilever, and arms which unitarily extend from opposite sides of said support part; and a frame having parts for engaging with and mounting the arms of said support member;

said arms of said support member respectively having mounting parts having a non-circular cross-section in the vicinity of the end part thereof, for engaging the engaging parts of said frame, and constricted parts formed with first flange portions between said mounting parts and said constricted parts;

said mounting parts and said engaging parts being shaped so that said support member is at an angular position together with said cantilever where said reproducing element is at a raised position, when said mounting parts are mounted onto said engaging parts.

2. A signal pickup device as claimed in claim 1 in which said mounting parts of said support member are of square cross-sectional shape, and said engaging parts of said frame are cutouts having square shapes.

3. A signal pickup device as claimed in claim 2 in which said mounting parts of said support member are formed so that a center line parallel with both side surfaces of the square cross-sectional shape is inclined by a predetermined angle $\theta$ with respect to a line which is perpendicular to an axial line of the cantilever supported by said support member, and both side edges of the cutouts in said frame are formed perpendicular with respect to a lower end edge of said frame.

4. A signal pickup device as claimed in claim 1 in which said mounting parts are formed so that second flange portions remain at tip ends of said arms of said support member.

5. A signal pickup device as claimed in claim 1 in which the minimum size of said constricted parts is smaller than the minimum size of said mounting parts.

6. A signal pickup device as claimed in claim 1 which further comprises means for rotating the cantilever supported by said support member, towards a downward direction.

7. A signal pickup device as claimed in claim 1 which further comprises means for displacing the cantilever supported by said support member, towards the right and left directions and towards an axial direction of the cantilever.

* * * * *